No. 661,843. Patented Nov. 13, 1900.
F. G. BRIGHT.
CULTIVATOR.
(Application filed Apr. 23, 1900.)
(No Model.) 3 Sheets—Sheet 1.
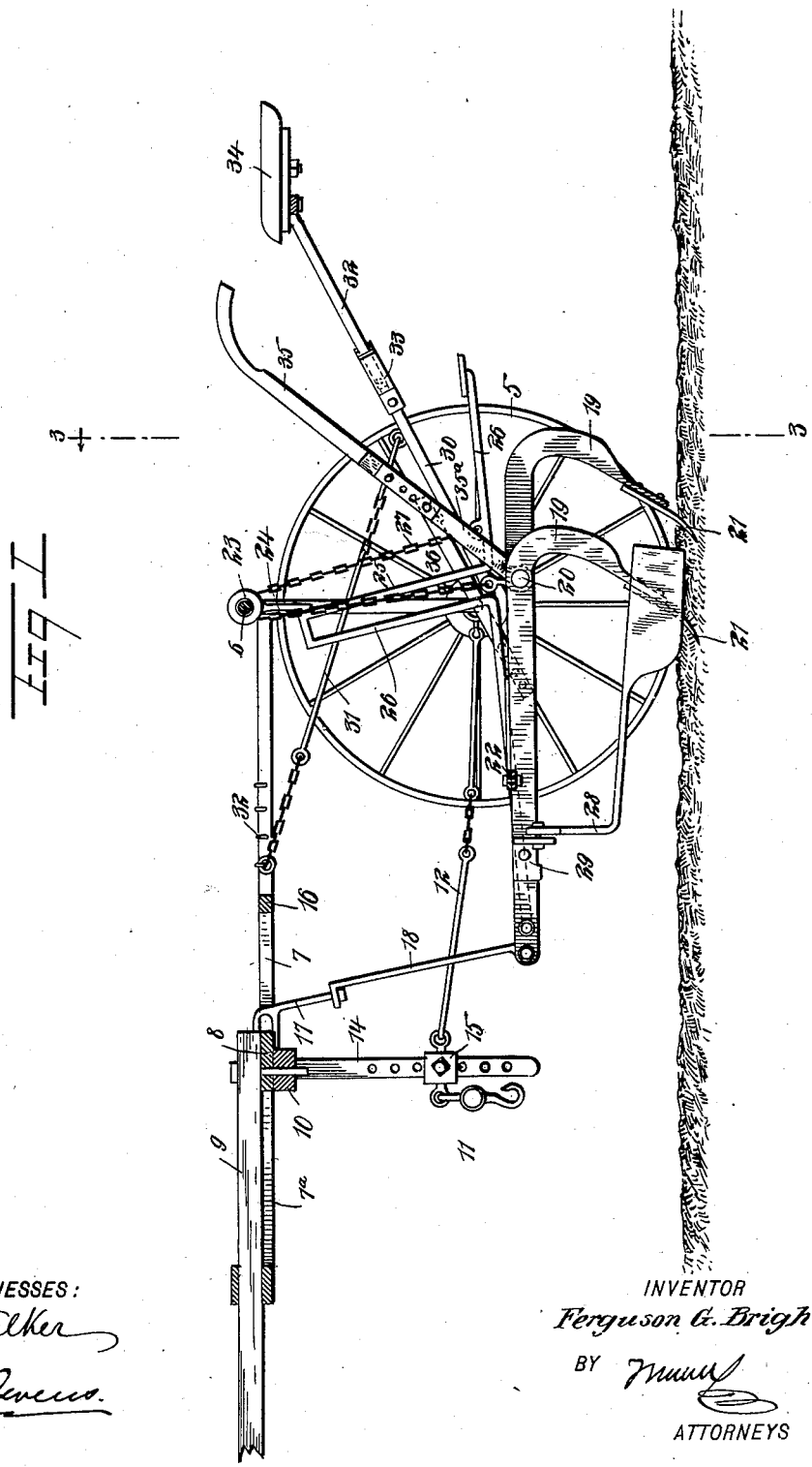
WITNESSES:
H. Walker
J. B. Owens.
INVENTOR
Ferguson G. Bright.
BY
ATTORNEYS

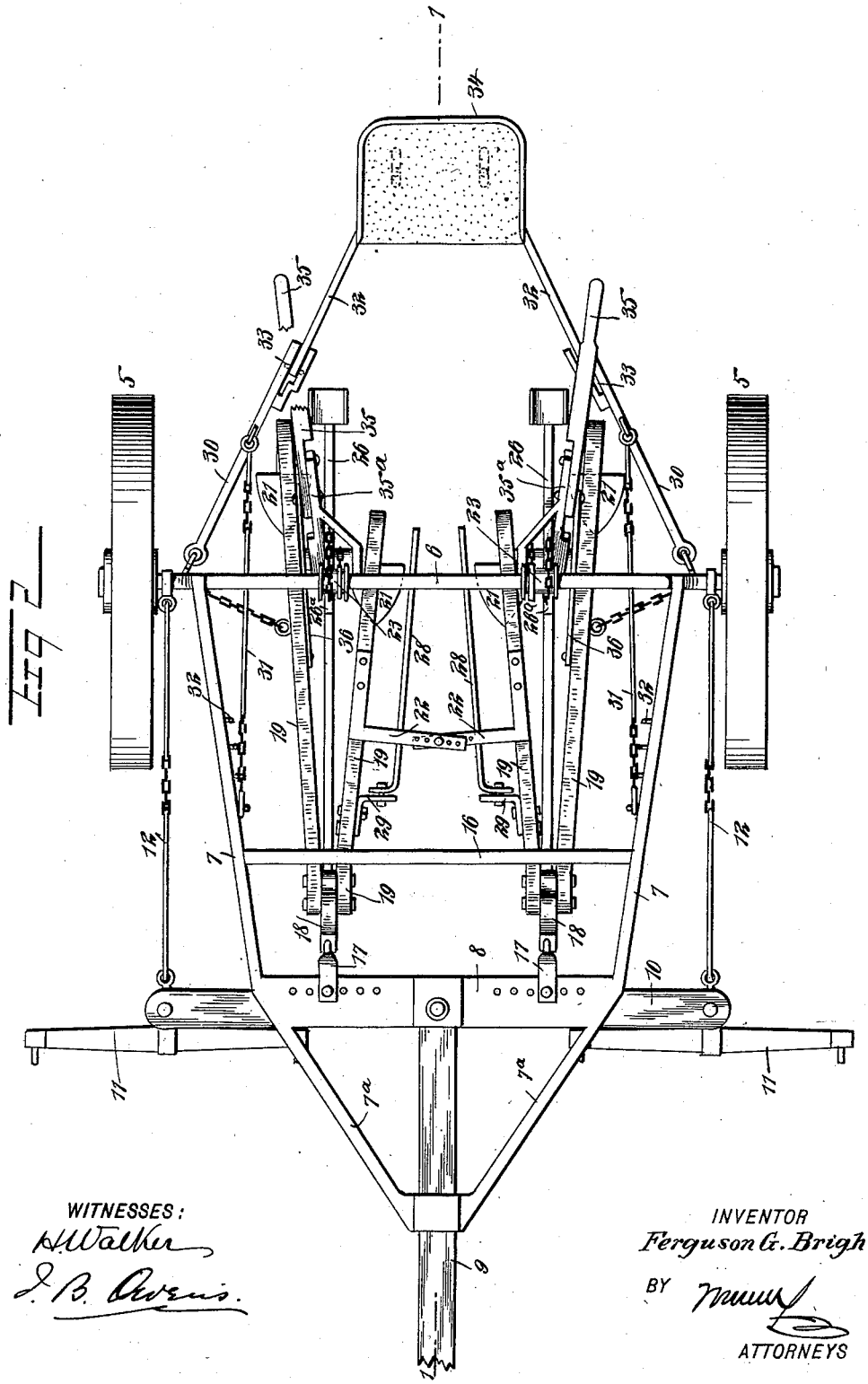

No. 661,843. Patented Nov. 13, 1900.
F. G. BRIGHT.
CULTIVATOR.
(Application filed Apr. 23, 1900.)
(No Model.) 3 Sheets—Sheet 3.
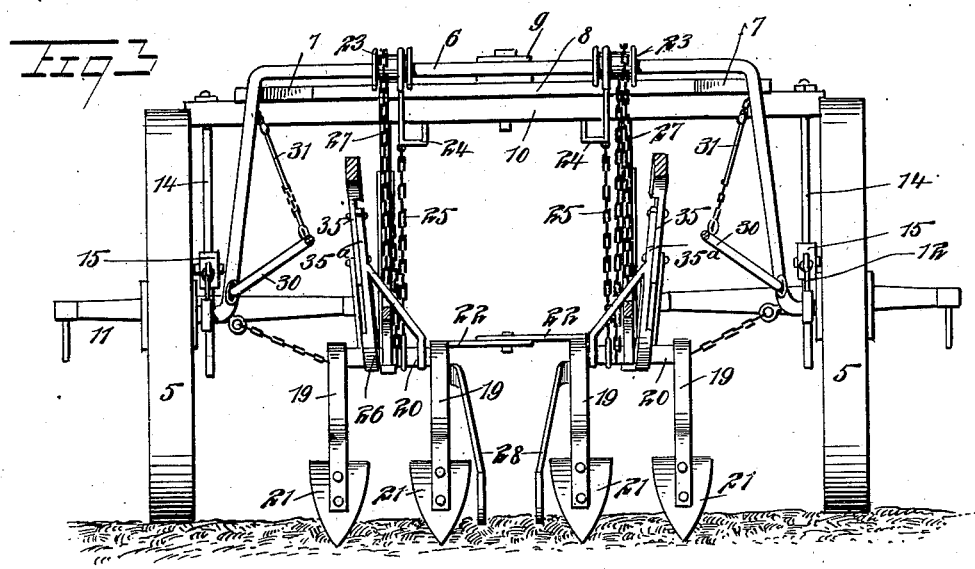
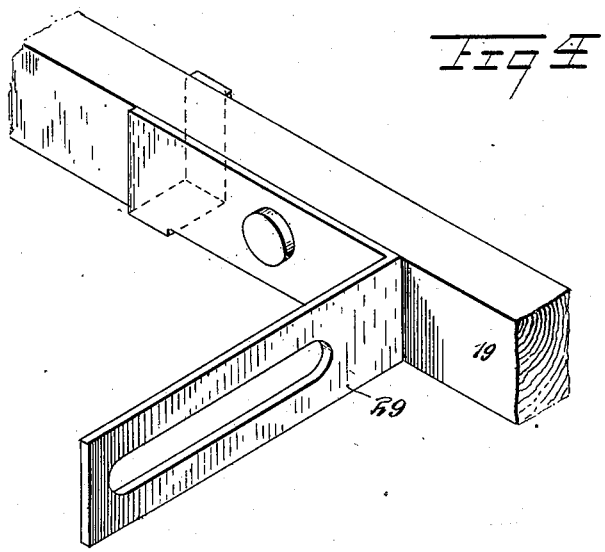
WITNESSES:
H. Walker
Q. B. Owens
INVENTOR
Ferguson G. Bright.
BY
ATTORNEYS

UNITED STATES PATENT OFFICE.

FERGUSON GRAHAM BRIGHT, OF COMMERCE, MISSOURI.

CULTIVATOR.

SPECIFICATION forming part of Letters Patent No. 661,843, dated November 13, 1900.

Application filed April 23, 1900. Serial No. 13,911. (No model.)

*To all whom it may concern:*

Be it known that I, FERGUSON GRAHAM BRIGHT, a citizen of the United States, and a resident of Commerce, in the county of Scott and State of Missouri, have invented a new and Improved Cultivator, of which the following is a full, clear, and exact description.

This invention relates to a cultivator which has certain novel features of construction enabling it to be used in connection with all classes of plants and also either as a riding or walking machine.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a longitudinal section on the line 1 1 of Fig. 2. Fig. 2 is a plan view of the invention. Fig. 3 is a cross-section on the line 3 3 of Fig. 1, and Fig. 4 is a detail perspective view of the bracket to which the guards are fastened.

The cultivator is carried on two wheels 5, mounted on an axle 6, the axle being arched upward between the wheels and the wheels turning on the axle-spindles, as will be understood. A frame comprising side bars 7, having converging front extensions 7ª and a cross-beam 8 at the front of the side bars 7, is mounted rigidly on the axle by the attachment of the rear ends of the side bars 7 to the axle, as shown. A tongue 9 is carried by the frame, and a doubletree 10 is mounted on the cross-beam 8 and carries singletrees 11, to which the team is hitched. The ends of the doubletree 10 are connected by chains and rods 12 with the respective ends of the axle 6, so as to pull directly thereon. As shown in Fig. 1, the singletrees 11 are supported on the doubletree 10 through the medium of bars 14, which are carried by the ends of the doubletree and extend downward therefrom. Sleeves 15 are adjustably mounted on the bars 14 and have singletrees connected therewith. The chains and rods 12 are also connected with the sleeves 15, as shown. If desired, the frame of the machine may be further braced by a cross-rod 16, extending between the side bars 7.

Transversely adjustable on the cross-beam 8 are two hangers 17, to the lower ends of which rods 18 are shackled. These rods 18 respectively carry two pairs of shovel-beams 19, the beams being pivoted at the lower ends of the rods, and the members of each pair being rigidly connected by rods 20, which pass between them, as shown. The beams 19 carry shovels or plows 21 in the usual manner. The two pairs of shovel-beams 19 are rigidly connected with each other by arms 22, attached to the two inner beams 19 and extending toward each other, where they are adjustably connected together. The axle 6 at its middle portion carries two sheaves 23, and from these sheaves are respectively loosely-suspended hooks 24. By throwing upward the beams 19 they may be engaged with the hooks 24 and held in such raised position, in which case the plows or shovels 21 will of course be out of operative adjustment. Chains 25 (see Fig. 3) are attached to the hooks 24 and extend downward to the respective rods 20, to which they are also attached, and these chains 25 serve to limit the downward movement of the beams 19, and consequently the depth at which the shovels enter the ground. Pivotally mounted between the respective pairs of beams 19 and directly adjacent to the rods 18 are two foot-levers 26, each of which is formed with a return-bend 26ª, such bends permitting the rods 20 to pass thereinto, and consequently to move to each side of the longitudinal lines of the levers. Chains 27 are attached to the respective levers 26 and pass into connection with the rods 20, the chains passing over the sheaves or rollers 23. The foot-levers 26 when pressed downward at their rear ends will throw the beams 19 upward, and thus disengage the shovels from the ground. Guards 28 are provided, such guards lying between the two pairs of shovels or plows 21 and having their front ends adjustably fastened to brackets 29, secured to the two inner beams 19. These brackets 29, as shown in Fig. 4, are slotted to permit the adjustment of the guards.

Shackled to the end portions of the axle 6 are the lower seat-arms 30, which are sustained in the position shown in Figs. 1 and 2 by chains and rods 31, attached thereto and to the side bars 7 of the frame of the machine at points forward of the axle. The side bars are provided with a number of hooks 32, enabling the adjustment of the chains 31, and consequently permitting the inclination of the arms 30 to be regulated. The arms 30 carry extension-arms 32, which are attached thereto by knuckle-joints 33, and which are therefore held as shown in Fig. 1 and are at the same time capable of being thrown forwardly on the arms 30 and independently thereof. A seat 34 is adjustably carried by the extension-arms 32. It will therefore be seen that when the seat is thrown into the position shown in Fig. 1 the cultivator may be used as a machine to be ridden by the driver, and by throwing the arms 30 and 32 forwardly and turning the arms 32 down over the front of the axle the machine may be used as a walking-machine. Handles 35 are provided for use in case the driver walks behind the machine, and these handles are pivotally mounted on the respective rods 20 and adjustably held in the desired rigid position by brace-rods 36, which are fastened to the adjacent beams 19 and to the handles and provided with suitable devices for adjusting them in the manner described. The handles are formed in two sections, designated 35 and 35ª, which are adjustably connected, whereby to regulate the length of the handles.

Having thus described my invention, I claim as new and desire to secure by Letters Patent—

1. In a cultivator, the combination of two shovel-beams sustained at their front ends, a rod extending rigidly between the rear portions of the shovel-beams, a foot-lever mounted on the front portions of the shovel-beams and having a return-bend therein permitting the rod to pass beyond each side of the longitudinal line of the foot-lever, and a chain or other flexible connection passing between the foot-lever and the shovel-beams and running over the axle of the machine.

2. A cultivator, having a frame, a shovel-beam pivotally mounted thereon and having a transversely-disposed rod or other part attached thereto, a foot-lever pivotally mounted on the front portion of the machine and having a return bent portion capable of moving over the rod of the shovel-beam, and a flexible connection extending between the foot-lever and the shovel-beam and passing over a part of the frame.

3. A cultivator having a frame, comprising a cross-beam at the front thereof, a hanger attached to the cross-beam, a shovel-beam, the front end of which is supported from the hanger, a wheeled axle for the frame, a doubletree connected with the cross-beam at the front of the frame, bars carried by the doubletree and extended downward therefrom, singletrees adjustably carried on the bars, and connections extending between the singletrees and the axle.

In testimony whereof I have signed my name to this specification in the presence of two subscribing witnesses.

FERGUSON GRAHAM BRIGHT.

Witnesses:
JNO. H. PARRISH,
M. L. OGDEN, Jr.